United States Patent [19]

Menon

[11] Patent Number: 4,489,798

[45] Date of Patent: Dec. 25, 1984

[54] WEIGHT MEASURING APPARATUS WITH WEIGHT DISTRIBUTED ALONG AN ARRAY OF LONGITUDINAL AXES

[75] Inventor: Narendranath Menon, Arlington, Tex.

[73] Assignee: General Electrodynamics Corp., Arlington, Tex.

[21] Appl. No.: 490,118

[22] Filed: Apr. 29, 1983

[51] Int. Cl.³ .............................................. G01G 5/04
[52] U.S. Cl. .................................... 177/209; 177/254
[58] Field of Search ........................ 177/208, 209, 254

[56] References Cited

U.S. PATENT DOCUMENTS

| 2,107,883 | 2/1938 | Benedek. | |
|---|---|---|---|
| 2,314,011 | 3/1943 | Maurer. | |
| 2,857,152 | 10/1958 | Aske | 177/209 |
| 2,886,301 | 5/1959 | Aske. | |
| 2,932,501 | 4/1960 | Hicks. | |
| 3,178,937 | 4/1965 | Bradley | 177/254 X |
| 3,191,701 | 6/1965 | Gray. | |
| 3,376,738 | 4/1968 | Biffle | 177/208 |
| 3,464,509 | 9/1969 | Gray. | |
| 4,007,800 | 2/1977 | Janach et al. | 177/209 |
| 4,184,555 | 1/1980 | Maltby et al. | 177/208 |

FOREIGN PATENT DOCUMENTS 59173  3/1967  German Democratic Rep. .

OTHER PUBLICATIONS

Load O Meter Corporation brochure on Portable Weighing Devices, "Haenni Scale For Wheel-Loads."

Primary Examiner—E. A. Goldberg
Assistant Examiner—Patrick W. Foster
Attorney, Agent, or Firm—Jerry W. Mills; Gregory M. Howison; Nina Medlock

[57] ABSTRACT

A weighing scale (10) includes a base (12) with longitudinal channels (14) milled therein. A layer (20) of elastic deformable material is disposed over these channels with longitudinal rods (22) disposed over the layer (20) and oriented along the longitudinal axis of an associated one of the longitudinal channels (14). A connecting channel (18) connects the longitudinal channels (14) together to form a common reservoir. A load bearing deformable layer (30) is disposed over the rods (22) to distribute weight thereto. The weight is transferred through the rods (22) to the portion of the layer (20) covering each of the channels (14). The channels (14) are filled with a fluid that expands outward from the channels when weight is applied to any of the rods (22), thereby reducing the volume in the channel (14). A gauge (34) having a diaphragm disposed therein measures the volumetric change within the channels (14).

20 Claims, 6 Drawing Figures

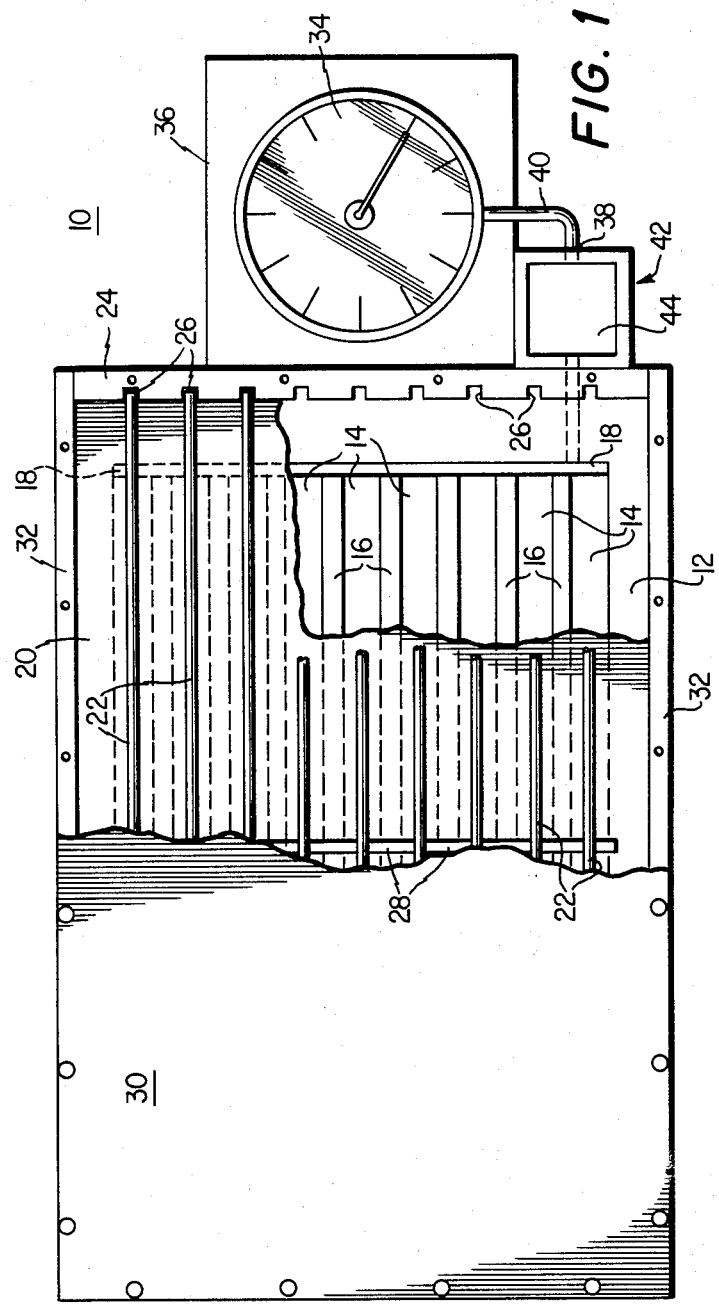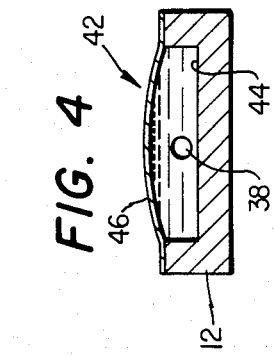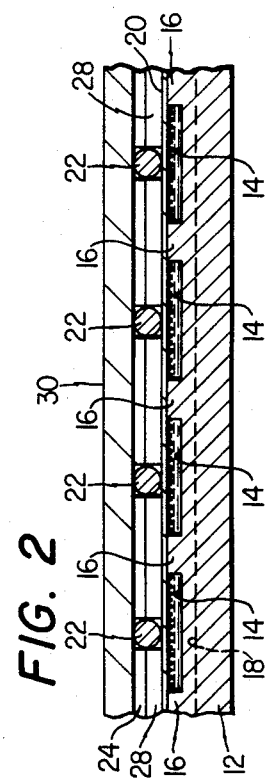

WEIGHT MEASURING APPARATUS WITH WEIGHT DISTRIBUTED ALONG AN ARRAY OF LONGITUDINAL AXES

TECHNICAL FIELD

The present invention pertains in general to weight scales and, more particularly, to portable scales for measuring relatively large loads.

BACKGROUND OF THE INVENTION

Portable scales for use in measuring large loads such as heavy vehicles require that they be relatively light weight with a small size and a low profile. The environment in which these portable scales are utilized also requires resonably stable temperature characteristics to provide a reasonably accurate measurement of the weight. Normally, prior art scales have provided some type of zeroing mechanism to compensate for temperature variations. However, this mechanism requires that the scale be allowed to stabilize prior to performing the weight measurement. These types of scales are impractical in a normal environment since the scale may be removed from one temperature medium and suddenly placed in another temperature medium, such as a concrete road, resulting in substantial inherent inaccuracies.

Previously developed scales have utilized either some arrangement of springs or hydraulics to measure vehicle weight. In the past, such apparatus has often been bulky in order to achieve the required degree of accuracy. One device that has provided a relatively small scale is disclosed in U.S. Pat. No. 4,007,800 issued to W. Janach, et al. This scale utilizes a plurality of parallel elliptically shaped hollow spring elements. The spring elements all communicate with a gauge and are filled with a fluid. A plate disposed on top of the spring elements compresses the spring elements when subjected to an external weight. The compression of these spring elements results in a volumetric decrease thereby forcing the fluid therein to be displaced into an external reservoir, which is comprised of an expanding bellows type gauge. The deflection of the bellows is proportional to the deflection of a needle on the gauge. By measuring the volumetric change, the elastic deformation of the spring elements can be converted to a weight measurement.

Although the Janach patent discloses a low profile scale, the use of the elliptical spring elements presents manufacturing and cost problems. This is due to the fact that the elliptical spring elements are essentially tubular members that must be carefully dimensioned and attached to a base on the exterior thereof and then the interiors thereof must be attached to a common channel connecting them to the gauge. In addition, the temperature stability of such previously developed scales has not been completely satisfactory. There thus exists a need for a light weight portable scale with improved accuracy and with temperature compensation, that is relatively simple to manufacture.

SUMMARY OF THE INVENTION

The present invention described and claimed herein comprises an apparatus for measuring weight. The apparatus includes a base with a plurality of longitudinal channels formed therein. A connecting channel is disposed between the longitudinal channels to form a common reservoir which is filled with a liquid. A first layer of deformable material is disposed over the channels to define a sealed volume therein. A second layer of deformable material is disposed over the first layer to receive the weight and separated therefrom by a plurality of force transferring members. Each of the force transferring members is associated with one of the channels such that a portion of the weight applied to the second deformable layer is distributed along the portion of the first layer covering each of the channels such that the force is concentrated essentially along the axis of the longitudinal channel. A volume measuring gauge is in fluid communication with the sealed volume to permit measurement of volume displacement therein and allow expansion of fluid when weight is applied to the second deformable layer.

In another embodiment of the present invention, a temperature variable sealed volume is inserted between the gauge and the sealed volume defined by the channels. This temperature variable volume compensates for volumetric variances of the fluid over temperature to maintain an essentially constant volume for all temperatures. This temperature variable sealed volume is comprised of a channel disposed in the base with a bi-metallic cover disposed thereover. The bi-metallic cover is operable to expand and contract over temperatures to increase and decrease the volume of fluid in the rectangular channel.

In yet another embodiment of the present invention, the load transferring members disposed between the first and second deformable layers are circular rods that are positioned essentially along the center line of each of the longitudinal channels. The ends of the rods are spaced apart an equal distance such that the relative orientation of each of the rods with respect to the associated one of the channels is identical for all rods.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a planar view of the scale of the present invention with portions thereof cut away to illustrate the various assemblies;

FIG. 2 illustrates a cross-section taken along lines 2—2 of FIG. 1;

FIG. 4 illustrates a sectional view of the temperature variable sealed volume;

DETAILED DESCRIPTION OF THE INVENTION

Figure 6:
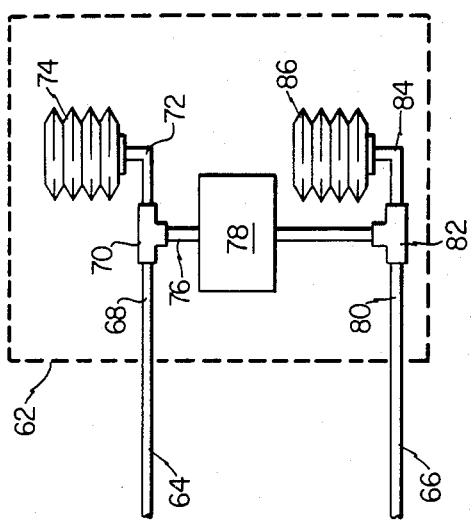
FIG. 6 illustrates the differential measuring apparatus of the embodiment of FIG. 5.

Referring now to FIG. 1, there is illustrated a planar view of a scale 10 with cutaway portions illustrating the assemblies therein. The scale 10 includes a rectangular base 12 having a plurality of longitudinal channels 14 milled therein. Each of the longitudinal channels 14 is separated by a spacer 16 such that all of the longitudinal channels 14 are parallel and equi-distant from the adjacent ones of the longitudinal channels. A connecting channel 18 is disposed in the spacer 16 between adjacent ones of the longitudinal channels 14. In the preferred embodiment, the connecting channels 18 are disposed at one end of the longitudinal channels 14. The connecting channels 18 provide a communication pathway between adjacent ones of the longitudinal channels 14.

A layer of elastic deformable material 20 is disposed over the longitudinal channels 14 to provide a cover therefore. The layer 20 is bonded to the base 12 with an adhesive film such that the layer 20 adheres to and seals the surface of the base 12 around the perimeter of each of the longitudinal channels 14. In addition, the layer 20 covers the connecting channels 18. The combination of the longitudinal channels 14, the connecting channels 18 and the layer 20 forms a sealed volume with the connecting channels providing an essentially common reservoir such that the pressure in all channels is identical.

A plurality of longitudinal rods 22 are disposed adjacent the layer 20 on the side opposite the longitudinal channels 14. Each of the rods 22 are positioned diametrically opposite one of the longitudinal channels 14. The rods 22 are positioned such that they have their longitudinal axis essentially aligned along the axis of the associated one of the longitudinal channels 14 and parallel thereto.

A spacer bar 24 is disposed on the base 12 at one end of the longitudinal channels 14. The spacer bar has a plurality of notches 26 disposed therein and aligned essentially along the axis of each of the longitudinal channels 14. The notches 26 are operable to receive one end of the rods 22. An identical spacer bar (not shown) is disposed at the other end of the longitudinal channels 14. The notches 26 are dimensioned to prevent movement both perpendicular to the longitudinal axis of the rods 22 and also in one of the axial directions. Movement in the remaining axial direction is prohibited by the combination of the two space bars disposed at opposite ends of the base 12.

It is an important aspect of the present invention that the distance between adjacent ones of the notches 26 are equal such that the rods 22 will be disposed an equal distance apart. However, the notches 26 maintain only the ends of the rods 22 equi-distant from each other. To prevent warping or bending of the rods in the middle thereof, a spacer 28 is disposed on the layer 20 for receiving the middle portion of each of the rods 22. For simplicity purposes, only one of the spacers 28 is illustrated. The spacer 28 preferably has a height above the layer 20 less than the diameter of the rods 22.

A layer of deformable material 30 is disposed over the rods 22 with the rods 22 preventing contact of the layer 30 with the layer 20. A rim 32 and a rim 33 are disposed along the edges of the base 12. The rims 32 and 33 and the spacer bar 24 form a supporting member to which the peripheral edges of the layer 30 are attached. The height of the rims 32 and 33 and the spacer bar 24 above the base 12 is essentially equal to the height of the rods 22 above the base 12 such that the layer 30 rests on each of the rods 22. This is best illustrated with reference to FIG. 3 which illustrates an exploded view of the embodiment of FIG. 1.

A gauge 34 is disposed in a mounting bracket 36 on one end of the base 12. The gauge 34 communicates with an orifice 38 in the side of the base 12 through a tubing 40. The orifice 38 communicates with at least one of the longitudinal channels 14 through a temperature variable chamber 42. The temperature variable chamber 42 will be described hereinbelow. The gauge 34, the temperature variable chamber 42 and the tube 40 all comprise part of the sealed volume formed from the longitudinal channels 14 and the connecting channels 18.

Referring now to FIG. 2, there is illustrated a cross-sectional view taken along lines 2—2 of FIG. 1. Each of the channels 14 is filled with a fluid which, in the preferred embodiment, is a relatively incompressible fluid such as hydraulic fluid. However, it should be understood that any suitable fluid can be utilized. The deformable layer 30 functions as the primary weight bearing surface upon which the weight is essentially disposed resulting in a vertical force thereon. The weight on the deformable layer 30 is transferred to the rods 22 and therethrough to the layer 20. It is important to note that the force is only applied to the portion of the layer 20 directly adjacent and in contact with each of the rods 22. Therefore, a force directed on to the layer 30 is distributed therethrough to the rods 22 and therefrom to only selected portions of the layer 20. This selected portion is essentially in the center of each of the channels 14 and axially aligned therewith. Since the layer 20 is fabricated from a deformable elastic material, a force directed perpendicular to the plane of the layer 20 will result in deformation thereof.

The layer 20 can be fabricated from any material such as aluminum, copper or any elastic material. As long as the force directed onto the layer 20 does not exceed the range of elasticity of that material, the material will return to its normal positiion, such as that shown in FIG. 2. The thickness of the layer 20 for a particular material is determined by the number of rods 22 and the amount of weight to be distributed therebetween. To reduce the maximum amount of deformation that will occur adjacent each of the rods, additional rods can be added to further distribute the weight across the layer 20. It should be understood that for each additional rod 22 that is added, an additional channel 14 must also be utilized.

Deformation of the portion of the layer 20 proximate the rod 22 results in a decreased volume of fluid disposed in the associated one of the channels 14. Since the fluid disposed therein is incompressible, it is necessary to provide an expanding reservoir for the fluid to escape to. This expanding reservoir is inherent in the gauge 34 which is a diaphragm pressure gauge that, in the preferred embodiment, is of the type Model Number 612.20 manufactured by Wika Instruments. This is essentially an expanding bellows type diaphragm which expands under slight pressure increases. This is a low pressure gauge which results in a very small back pressure on the fluid. This back pressure is negligible in respect to the amount of force applied by each of the rods 22 to the layer 20. Therefore, the fluid in the overall sealed volume is essentially at a constant pressure and the gauge 34 provides a measurement of volumetric expansion. It is important to note that the use of a fluid at a relatively constant pressure aids the assembly of the scale 10 in that the difference between the pressure internal to the channels 14 and that exterior thereof is essentially equal with very minor variations therebetween. Therefore, the bonding agents attaching the layer 20 to the partition 16 and generally around the perimeter of each of the channels 14 does not have to be a high pressure adhesive. It merely has to provide a low pressure seal.

The layer 30 should also be fabricated of a deformable material such as that utilized for the layer 20. In order to distribute the weight to the rods 22, the relative diameters of the rods 22 should not prevent contact between the upper surface of any of the rods 22 and the deformable layer 30. By utilizing a deformable material, a slight increase in resistance from a rod having a slightly larger diameter than another rod results in a larger opposing force at the contact point therebetween. The smaller diameter rod does not generate the same opposing force thereby allowing the weight applied to the layer 30 to deform the metal until it contacts the smaller diameter rod. In this manner, the weight is more evenly distributed. However, it should be understood that slightly more displacement of one rod as compared to another results in slightly greater deformation of the layer 20 directly beneath that particular rod. This larger deflection merely results in a greater decrease in the volume of the associated sealed chamber defined by the associated longitudinal chamber. Since the elastic constant of the layer 20 is essentially linear over the range of deformation, the inaccuracy resulting from slight differences in the diameter of the rods is negligible due in part to the deformable characteristics of the layer 30. It is only important that the deformation does not surpass the elastic constant thereby permanently deforming any portion of the layer 20.

Figure 3:
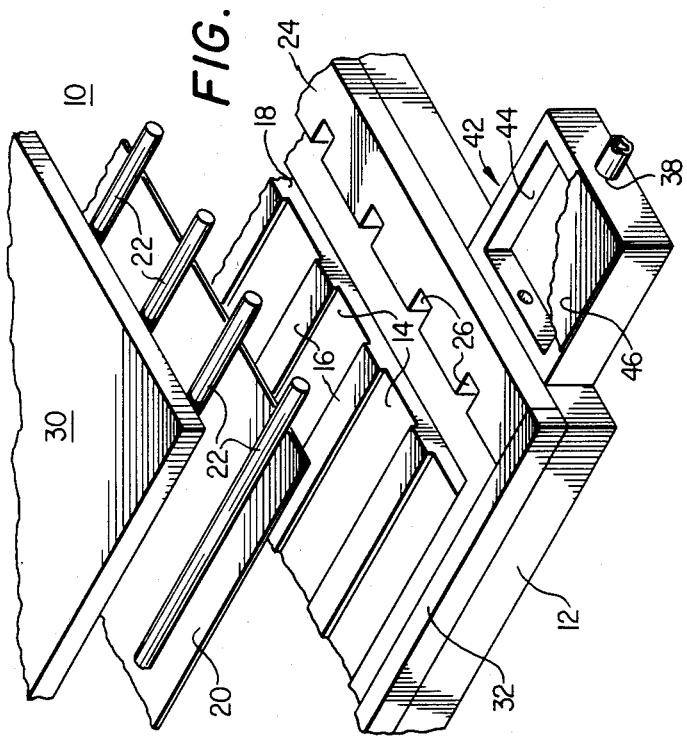
FIG. 3 illustrates an exploded view of the embodiment of FIG. 1.

The distance between adjacent rods 22 is equal as determined by the spacer bar 24 and the spacers 28, as illustrated in FIG. 1. For example, if the location of the notches 26 in the spacer bar 24 results in one bar aligned slightly off center with respect to the associated one of the longitudinal channels 14, the adjacent one of the rods 22 will also be aligned slightly off center and biased in the same direction. Therefore, deformation of the layer 20 directly beneath one rod will be equivalent to a deformation beneath an adjacent rod. It is only important that all deformations occur in the same manner and be subjected to the same opposing force from the layer 20. This is due to the fact that the elastic constant of the layer 2 in the center thereof is different from positions departing from the center thereof. By assembling the scale 0 as shown in FIGS. 1-3, a very low profile scale results.

In the preferred embodiment, the base 12 is dimensioned to be approximately one-half of an inch in thickness. The layer 20 is fabricated from aluminum having a thickness of 1/16th of an inch. The rods 22 are dimensioned to have a thickness of 3/16ths of an inch. The layer 30 is also fabricated of aluminum and is dimensioned to have a thickness of approximately ⅛th of an inch. The overall dimensions for the scale 10 are approximately one inch in thickness. Since the metal utilized is aluminum, this results in a fairly light weight and portable scale.

Referring now to FIG. 4, there is illustrated a cross-sectional detailed view of the temperature variable sealed volume 42. The temperature variable sealed volume is comprised of a milled rectangular channel 44 disposed in the base 12 and integral therewith. The channel 44 is covered by a layer of bi-metallic material 46. The bi-metallic material is comprised of two different layers of temperature expansive material that has different temperature coefficients. The result is that the layer 46 will become concave for a temperature variation in one direction and convex for a temperature variation in the opposite direction. The result is that the volume in the chamber defined by the channel 44 and the layer 46 varies as a function of temperature. For a fluid which expands as temperature increases, the bi-metallic layer forming the layer 46 will be chosen such that the layer 46 becomes convex as temperature increases thereby increasing the volume and maintaining a constant pressure within the overall sealed volume. Since the gauge 34 is operable to measure an increase of volume over that present in the sealed volume defined by the longitudinal channels 44 and the connecting channels 18, this temperature variable volume 42 essentially varies the sealed volume to compensate for increases in volume of the fluid. In addition, there are some volumetric variations resulting from expansion and contraction of the base 12. These also can be compensated by the Temperature variable volume 42.

Figure 5:
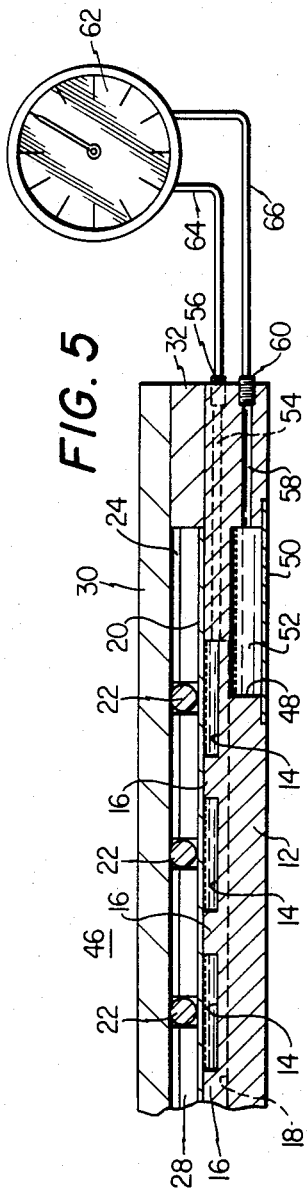
FIG. 5 illustrates a cross-sectional view of another embodiment of the present invention utilizing a differential measuring system.

Referring now to FIG. 5, there is illustrated a cross-sectional view of a weighing scale 46 which is another embodiment of the scale 10 of FIG. 1 wherein like numerals refer to like parts in the various figures. In the scale 46, a channel 48 is milled on the side of the base 12 opposite the longitudinal channels 14. A cover 50 is disposed over the channel 48 to define a chamber 52 therein. The volume of the compensating chamber 52 is essentially equal to the total volume of all of the longitudinal channels 14 and the connecting channels 18. The compensating chamber 52 is filled with a liquid identical to the liquid in the longitudinal channels 14. Therefore, an increase or decrease in volume resulting from temperature variations results in an equal increase or decrease in volume in the compensating chamber 52.

A conduit 54 is disposed in the base 12 connecting an orifice 56 disposed on the outside of the base 12 to at least one of the channels 14 to provide fluid communication therebetween. A conduit 58 is disposed in the base 12 connecting an orifice 60 to the compensating chamber 52 to provide fluid communication therebetween. A differential gauge 62 has one of its differential inputs connected to the orifice 56 through a connecting conduit 64 and the other differential input thereof connected to the orifice 60 through a connecting conduit 66. The differential gauge 62 is operable to read the difference in volumetric change between the liquid contained in the compensating chamber 52 and the liquid contained in the longitudinal channels 14. As described above, a volumetric expansion or contraction of the liquid disposed in the longitudinal channels 14 will be compensated by an equal volumetric expansion or contraction, respectively, of the liquid contained in the compensating chamber 52. When weight is applied to the layer 30, fluid is expelled from the longitudinal chambers 14 resulting in an additional volumetric displacement that is not compensated by the compensating chamber 52. This difference in volumetric expansion between the two chambers is registered on the differential gauge 62, as will be described hereinbelow.

Referring now to FIG. 6, there is illustrated one embodiment of the differential gauge 62 of FIG. 5. The connecting conduit 64 is input to the differential gauge 62 to connect with a connecting conduit 68. The other end of the connecting conduit 68 is connected to a tee 70. The other end of the tee 70 is connected to one end of a connecting conduit 72. The other end of the connecting conduit 72 is connected to an expandable diaphragm or bellows 74. The tee 70 is also connected through a conduit 76 to a strain gauge 78. The connecting conduit 66 that communicates with the compensating chamber 52 is input to the differential gauge 62 through a connecting conduit 80. The connecting conduit 80 has the other end thereof connected to a tee 82. The other end of the tee 82 is connected to one end of a connecting conduit 84. The other end of the connecting conduit 84 is connected to an expanding diaphragm or bellows 86.

The expanding diaphragms or bellows 74 and 86 are essentially identical to the gauge 34 of FIG. 1. The internal mechanism of the gauge 34 is essentially an expandable diaphragm or bellows. These bellows expand upon pressure exerted upon the fluid. Since this gauge 34 is a low pressure gauge, a pressure increase is required to expand the internal bellows in the gauge 34. Although the differential gauge 62 is illustrated using expanding bellows, it should be understood that other assemblies maay be used. For example, inverted U-tubes can be utilized wherein the increasing head pressure resulting from volumetric expansion creates a slight negative back pressure.

The difference in the slight negative back pressure resulting from the expansion of the bellows 74 and 86 is measured by the strain gauge 78. The strain gauge 78 is of a differential type manufactured by Ametek Controls Division Model No. 55AD001A. As long as the volumetric expansion is equal in both connecting conduits 64 and 66, the differential pressure registered on strain gauge 78 will be zero. However, when the pressure in connecting conduit 68 increases over that in connecting conduit 66, the strain gauge 78 will register a differential pressure therebetween. This differential pressure is proportional to the weight applied to the layer 30. However, it should be emphasized that the variations in pressure within both the longitudinal channels 14 and the compensating chamber 52 results in only negligable variations in the deformation of the layer 20.

In summary, there has been provided a weight scale that utilizes a plurality of longitudinal rods disposed underneath the main weight bearing surface. These longitudinal rods aid in distributing the weight to a plurality of concentrated points on a deformable elastic layer. The deformable elastic layer is allowed to expand downward into associated longitudinal fluid filled channels. The fluid in each of the channels is connected to form a common reservoir. Measurement of weight is accomplished by measuring the volumetric change in these channels as a function of the deformation of the elastic layer. In addition, a compensating chamber can be added and a differential gauge utilized for measuring the differential volumetric change. By measuring the differential volumetric change between the compensating chamber and the volume defined by the longitudinal channels, a weight measurement is provided that is independent of temperature changes since the volumetric change in the compensating chamber is adjusted to be identical over temperature with that of the volumetric change of the longitudinal channels.

Although the preferred embodiment has been described in detail, it should be understood that various changes, substitutions and alterations can be made therein without departing from the spirit and scope of the invention as defined by the appended claims.

What is claimed is:
1. An apparatus for measuring weight comprising:
a base;
a plurality of longitudinal channels disposed in said base;
means for connecting said channels together to allow them to communicate as a common reservoir;
said channels and said connecting means having a fluid disposed therein;
a layer of deformable material having an elastic constant, said deformable layer disposed over each of said channels to define a sealed volume therein;
a load bearing layer of material disposed over said channels for receiving the weight;
a plurality of longitudinal force transferring members disposed on the surface of said elastic layer, each of said longitudinal members associated with one of said longitudinal channels and oriented with respect to the associated one of said longitudinal channels such that force applied to said member is transferred to said elastic layer and concentrated along the central axis of the associated one of said longitudinal channels;
means for aligning said longitudinal members along said longitudinal channels such that the distance between adjacent ones of said longitudinal members is essentially constant for all of said longitudinal members, said aligning means defining the relative position of the concentrated force from said longitudinal members on the surface of said deformable layers with respect to the longitudinal axis of said channels; and
means for measuring volumetric displacement of said longitudinal channels as a function of deformation of said deformable layer resulting from weight applied to said load bearing layer.

2. The apparatus of claim 1 wherein said fluid is essentially incompressible.

3. The apparatus of claim 1 wherein said deformable layer comprises a sheet of aluminum disposed over all of said channels such that a sealed volume is defined within each of said channels bounded by the interior walls of each of said channels and the portion of said layer of aluminum disposed thereover.

4. The apparatus of claim 1 wherein said load bearing layer is comprised of a deformable material.

5. The apparatus of claim 1 wherein said longitudinal member means comprise a plurality of circular rods, each of said rods associated with an individual one of said channels, each of said rods oriented essentially in the center of and along the longitudinal axis of said channel adjacent said deformable layer and bonded thereto.

6. The apparatus of claim 1 further comprising compensating means for compensating volumetric changes of the liquid contained in said channels as a function of temperature.

7. The apparatus of claim 6 wherein said compensating means comprises a sealed chamber in communication with said channels, said sealed chamber having a temperature dependent volume with a temperature coefficient in the same direction as that of said liquid.

8. The apparatus of claim 7 wherein at least one of the sides of said sealed chamber is fabricated from a bi-metallic material that expands and contracts as a function of temperature.

9. An apparatus for measuring weight comprising:
a rectangular base;
a plurality of parallel longitudinal channels formed in said base and spaced an equal distance apart, each of said longitudinal channels having a rectangular cross-section;
a connecting channel disposed between said longitudinal channels at one end thereof to allow said longitudinal channels to communicate as a common reservoir;

a layer of elastic material disposed over said longitudinal channels and said connecting channel to form a sealed volume therein;

an incompressible fluid disposed in said longitudinal channels and said connecting channel;

a plurality of circular rods disposed on the surface of said elastic layer, each of said rods associated with one of said longitudinal channels and oriented along the longitudinal axis thereof;

means for positioning said rods an equal distance apart such that the orientation of one of said rods with the associated one of said longitudinal channels is essentially identical to the orientation of the remaining of said rods with the remaining of said associated longitudinal channels;

a layer of deformable material disposed over said rods for receiving the weight and distributing it to said rods, said deformable layer deforming to compensate for minor differences in the diameter of said rods;

a diaphragm pressure gauge in liquid communication with said sealed volume for measuring the pressure of the liquid contained in said sealed volume while allowing the fluid contained with said sealed volume to expand upon deformation of said elastic layer into said longitudinal channels and;

a temperature variable sealed volume disposed between said gauge and said sealed volume for compensating volumetric temperature variations of said liquid to maintain an essentially constant volume.

10. A temperature compensated weighing scale, comprising:

a first sealed chamber having an elastically deformable boundary surface;

a second sealed chamber having an essentially non-deformable boundary surface;

said second sealed chamber having a volume essentially equal to that of said first sealed chamber in the non-deformed state;

said first and second sealed chambers having a fluid disposed therein;

first reservoir means in fluid communication with said first chamber to allow for expansion and contraction thereof;

second reservoir means in fluid communication with said second chamber to allow for expansion and contraction thereof;

means for deforming the boundary surface of said first sealed chamber with an external mass that is to be weighed, deformation of the boundary surface causing the volume of said first sealed chamber to vary; and means for measuring the differential volumetric change of the fluid in said first chamber and said first reservoir with respect to the volume of fluid in said second chamber and said second reservoir wherein a volumetric change in the fluid in said first chamber and said first reservoir results in an essentially equal volumetric change in said second chamber and said second reservoir such that expansion or contraction of the liquid in said first chamber as a result of temperature is compensated by an essential equal contraction or expansion, respectively, of the fluid in said second chamber such that only the differential volumetric change is indicative of weight measurement.

11. The scale of claim 10 wherein said first sealed chamber comprises a chamber having a rectangular cross section with at least one side thereof fabricated from an elastically deformable material, said means for deforming operable to deform said deformable material.

12. The apparatus of claim 10 wherein said fluid disposed in said first and second sealed chambers is an essentially incompressible fluid.

13. The apparatus of claim 10 wherein said first and second reservoirs are comprised of expandable bellows attached to the respective one of said first and second reservoirs by an associated conduit.

14. The apparatus of claim 13 wherein said measuring means comprises a differential strain gauge disposed between said first and second bellows to measure the differential pressure therebetween.

15. A temperature compensated weighing scale, comprising:

a base;

an open chamber defined in said base;

a layer of elastically deformable material disposed over said open chamber to define a deformable sealed chamber;

a sealed compensating chamber defined in said base;

said deformable sealed chamber and said compensating chamber filled with a fluid;

said reservoir means connected to said deformable sealed chamber for allowing expansion and contraction of the fluid therefrom;

second reservoir means attached to said compensating chamber for allowing expansion and contraction of the fluid therefrom;

a load bearing layer for receiving the weight to be measured;

means disposed between said load bearing layer and said deformable layer for concentrating the weight on said load bearing layer to selected portions of said deformable layer such that only selected points on said deformable layer are deformed, deformation of said deformable layer causing a change in the volume in said sealed deformable chamber that is reflected in said first reservoir means; and means for measuring the difference in volumetric change of said first and second reservoir means such that a volumetric expansion or contraction of the fluid in said sealed deformable chamber caused by temperature variation is compensated by an essentially equal volumetric change in the fluid of said compensating chamber.

16. The apparatus of claim 15 wherein said open chamber comprises a plurality of channels disposed in said base having a connecting channel therebetween for forming a common reservoir.

17. The apparatus of claim 16 wherein said deformable layer is disposed over all of said longitudinal channels.

18. The apparatus of claim 19 wherein said deformable layer comprises a layer of aluminum.

19. The apparatus of claim 15 wherein said first reservoir means comprises a first expanding bellows in fluid communication with said sealed deformable chamber and said second reservoir means comprises a second expanding bellows in fluid communication with said compensating chamber, said first and second bellows providing a back pressure to said fluid that is substantially less than the force exerted by the weight on said deformable layer.

20. The apparatus of claim 19 wherein said means for measuring differential volumetric change comprises a differential strain gauge connected between said first and second bellows to measure the pressure difference between the fluids therein.

* * * * *

UNITED STATES PATENT AND TRADEMARK OFFICE
CERTIFICATE OF CORRECTION

PATENT NO. : 4,489,798
DATED : December 25, 1984
INVENTOR(S) : Narendranath Menon It is certified that error appears in the above-identified patent and that said Letters Patent is hereby corrected as shown below:

Col. 1, line 16, "requires resonably" should be --requires reasonably".
Col. 7, line 12, "maay be used." should be --may be used.--
Col. 9, line 62 (Claim 10), "essential equal" should be --essentially equal--.
Col. 10, line 54 (Claim 18), "The apparatus of Claim 19" should be --The apparatus of Claim 17--.

Signed and Sealed this

Eighteenth Day of June 1985

[SEAL]

Attest:

DONALD J. QUIGG

Attesting Officer    Acting Commissioner of Patents and Trademarks